United States Patent [19]

Kahn

[11] 4,018,994
[45] Apr. 19, 1977

[54] COMPATIBLE AM STEREOPHONIC RECEIVERS

[76] Inventor: Leonard R. Kahn, 70 N. Grove St., Freeport, N.Y. 11520

[22] Filed: May 2, 1975

[21] Appl. No.: 573,905

Related U.S. Application Data

[63] Continuation-in-part of Ser. No. 487,155, July 10, 1974, Pat. No. 3,908,090, and a continuation-in-part of Ser. No. 487,154, July 10, 1974, Pat. No. 3,944,749, each is a continuation-in-part of Ser. No. 251,947, May 10, 1972, abandoned.

[52] U.S. Cl. .............................. 179/15 BT; 325/36; 329/132; 329/135
[51] Int. Cl.² ......................................... H04H 5/00
[58] Field of Search ............ 179/15 BT; 325/36, 47, 325/345; 329/124, 130, 132, 135

[56] References Cited

UNITED STATES PATENTS

| | | | |
|---|---|---|---|
| 3,068,475 | 12/1962 | Avins | 329/135 |
| 3,076,057 | 1/1963 | Baugh | 179/15 BT |
| 3,143,600 | 8/1964 | De Vries | 329/135 |
| 3,218,393 | 11/1975 | Kahn | 325/36 |
| 3,500,217 | 3/1970 | Allen | 329/124 |

OTHER PUBLICATIONS

"The Phase-Shift Method SSB Signal Reception" by Norgaard, *Proceedings of the IRE*, Dec. 1956 pp. 1735–1743.

*Primary Examiner*—Douglas W. Olms
*Attorney, Agent, or Firm*—Graybeal, Barnard & Uhlir

[57] ABSTRACT

Compatible AM stereophonic receivers for reception of a radiant energy carrier wave modulated with two stereo related signals (L and R), each appearing as a respective first order single-sideband. Receivers embodying the invention in general improve an optimize output stereo signal quality by quadrature demodulation of the carrier to derive the stereo difference (L-R) signal, together with in-phase detection of the stereo summation (L+R) signal, the L+R and L-R signals thus derived being placed in phase and combined through sum and difference circuits to obtain the stereo related (L and R) outputs. Demodulation distortion may be minimized by inverse amplitude modulation of the carrier wave with a portion of at least the envelope fundamental (and preferably also one or more harmonics thereof). The carrier wave is preferably enhanced prior to quadrature demodulation and preferably is also modulated with an infrasonic frequency (e.g. 15 Hz) signal indicating stereo signal presence, with such infrasonic modulation either amplitude modulating or phase modulating the carrier wave. Such infrasonic modulation is utilized to automatically switch receiver output mode and to visually indicate stereo signal presence.

54 Claims, 8 Drawing Figures

Fig. 4.
SPECTRUM OF RECEIVED SIGNAL WITH CARRIER ENHANCED (AS AT 26)

Fig. 5.
AMPLITUDE MODULATOR OUTPUT SPECTRUM (AS AT 48)

COMPATIBLE AM STEREOPHONIC RECEIVERS

CROSS-REFERENCE TO RELATED APPLICATIONS

This application is a continuation-in-part of my application Ser. No. 487,155 entitled Compatible AM Stereophonic Transmission System filed July 10, 1974, which issued as U.S. Pat. No. 3,908,090 on Sept. 23, 1975, and my application Ser. No. 487,154 entitled Compatible AM Sterephonic Receivers Involving Sideband Separation at IF Frequency, filed July 10, 1974, which issued as U.S. Pat. No. 3,944,749 on Mar. 16, 1976, the said applications being in turn continuations-in-part of my now abandoned application Ser. No. 251,947 entitled AM Stereophonic Transmission and Reception System, and Methods and Components Utilized Therein, filed May 10, 1972.

BACKGROUND OF THE INVENTION

1. Field of the Invention

This invention relates to AM stereo receivers designed for reception of a carrier wave having stereo related intelligence appearing in the respective upper sideband and lower sidebands of the transmitted signal, such as disclosed in my prior U.S. Pat. No. 3,218,393, and in my aforesaid copending U.S. Pat. No. 3,908,090. AM stereo receivers according to the invention may incorporate carrier exaltation to reduce signal distortion at low levels of received signal strength and/or inverse amplitude modulation of the carrier and/or quadrature demodulation of the received carrier to derive stereo difference (L −R) signal intelligence and employ inphase detection (e.g. envelope detection or product demodulation) to derive the stero summation (L±R) signal intelligence followed by relative phase shifting and combining of the stereo sum and and difference signals in a manner known per se to produce stereo related (L and R) outputs. Modulation of the carrier wave by an infrasonic frequency (e.g. 15 Hz) is preferably utilized to indicate in the receiver the presence of a stereo modulated signal. Aspects of the invention also relate to specialized receiver circuitry with both stereophonic mode and monophonic mode capabilities and automatic switching therebetween.

2. Description of the Prior Art

Compatible stereophonic AM transmission and reception, involving stereo related upper and lower sidebands, with the difference stereo signal (L−R) intelligence phase modulating the carrier wave and with the summation stereo signal (L+R) intelligence envelope modulating the carrier wave, are disclosed in my U.S. Pat. No. 3,218,393, together with certain forms of receivers for stereophonic reception of a carrier wave so modulated. A further discussion of this compatible AM stereophonic modulation technique appears in my paper entitled "A Stereophonic System For Amplitude Modulated Broadcast Stations", which appears in IEEE Transactions on Broadcasting, Vol. BX-17, No. 2, June 1971, at pages 50–55. To the extent here relevant, the disclosures of this prior patent and this paper are incorporated herein by this reference.

Also known is the so-called "compatible" stereophonic AM system disclosed in Barton U.S. Pat. No. 3,102,167 which in effect utilizes a compromised quadrature modulation technique. To reduce monophonic distortion the Barton system utilizes a relative phase angle between the carrier and sidebands of ± 25° to 30°, with the two channel signals being developed by use of a phase displaced exalted carrier and product demodulation, but without any combining of the demodulated signals.

Also known are stereophonic transmission and reception systems as disclosed in Shoaf U.S. Pat. No. 3,009,151, involving a two-channel FM-AM stereo system wherein stereo related signals are respectively frequency modulated and amplitude modulated on FM band and AM band carrier waves; Colodny U.S. Pat. No. 3,031,529, disclosing a single channel AM stereo system employing synchronous detectors in the receiver portion of the system; Avins U.S. Pat. No. 3,068,475, disclosing a stereo transmission and reception system wherein one stereo related signal is amplitude modulated on a carrier wave and the other stereo related signal is frequency modulated on the same carrier wave; Fink U.S. Pat. No. 3,206,550, disclosing visual display of a stereo presence signal; Hold et al U.S. Pat. No. 3,167,614, disclosing use of an infrasonic tone to indicate stereo signal presence in an AM/PM type transmission system; and Collins U.S. Pat. No. 3,231,672, disclosing an AM stereo system involving linearly added carrier waves at the same frequency but in different phase, with each of the carrier waves amplitude modulated with stereo related signals.

SUMMARY OF THE INVENTION

Features and advantages of the present invention are realized by the presentation of various forms of AM stereophonic receivers for reception of a radiant energy carrier wave modulated with two stereo related signals (L and R), each appearing as an independent, first order single sideband with the carrier essentially being amplitude modulated with the stereo summation (L+R) intelligence and the carrier essentially being phase modulated with the stereo difference (L−R) intelligence, such receivers incorporating use of quadrature demodulation of the phase modulation representing the stereo difference (L−R) intelligence of the received signal, and one or more of the following techniques for optimizing output stereo signal quality:

1. use of inverse amplitude modulation of the carrier, i.e. use of the envelope fundamental (and one or more harmonics thereof as preferred forms) to additionally and inversely modulate the receiver carrier in a manner reducing distortion of the stereo difference signal derived from the additionally modulated carrier;
2. use of carrier enhancement, i.e. an exalted carrier, preferably with phase locked loop or like control of the carrier boost input so that essentially no phase modulation distortion occurs incident to the carrier boost and so that the stereo difference signal derived from the exalted carrier does not contain noise bursts even when the received carrier is fully (i.e. 100%) modulated; and
3. in conjunction with any of the above techniques means detecting and utilizing an infrasonic (e.g. 15 Hertz) tone modulated on the received carrier as an indication of stereo signal presence, such tone being preferably utilized to automatically control receiver output mode.

Further features and advantages of the present invention accrue from the avoidance of use in receivers of the present invention of such circuit components as sideband filters, with the result that circuits are readily adaptable to employment of integrated circuits. 33

Yet another advantage and feature of the AM stereophonic transmission and reception system and method of the present invention is the optional modulation of the carrier with an infrasonic frequency signal to indicate in the receiver stereo signal presence, which signal is utilizable to provide automatic shifting of the reception mode to and from stereophonic and monophonic and/or to provide a carrier tuning indicator.

Other features and advantages of the invention will be apparent from the following description and discussion of certain typical embodiments of the invention.

BRIEF DESCRIPTION OF THE DRAWINGS

FIG. 1 is a showing, in block diagram form, of a compatible AM stereo receiver designed to receive an AM stereo signal, such as developed in the transmission exciter shown in my aforesaid U.S. Pat. No. 3,908,090, for example, wherein the receiver incorporates enhancement of the phase modulated carrier wave, with utilization of carrier tracking circuitry employing phase locked loop type carrier selection, wherein the receiver employs in-phase detection in the form of an envelope detector to derive the stereo summation (L+R) signal and employs inverse modulation of the phase modulated exalted carrier by either the fundamental of the envelope or by both the fundamental and harmonic components derived from the received carrier envelope, coupled with quadrature demodulation of the phase modulated and inversely amplitude modulated exalted carrier wave to derive a low distortion stereo difference (L−R) signal, the receiver shown in FIG. 1 also including infrasonic tone detection means and electronic switching means responsive thereto to automatically change receiver output mode;

DETAILED DESCRIPTION OF THE PREFERRED EMBODIMENTS

Figures 1, 2, 3, 8:
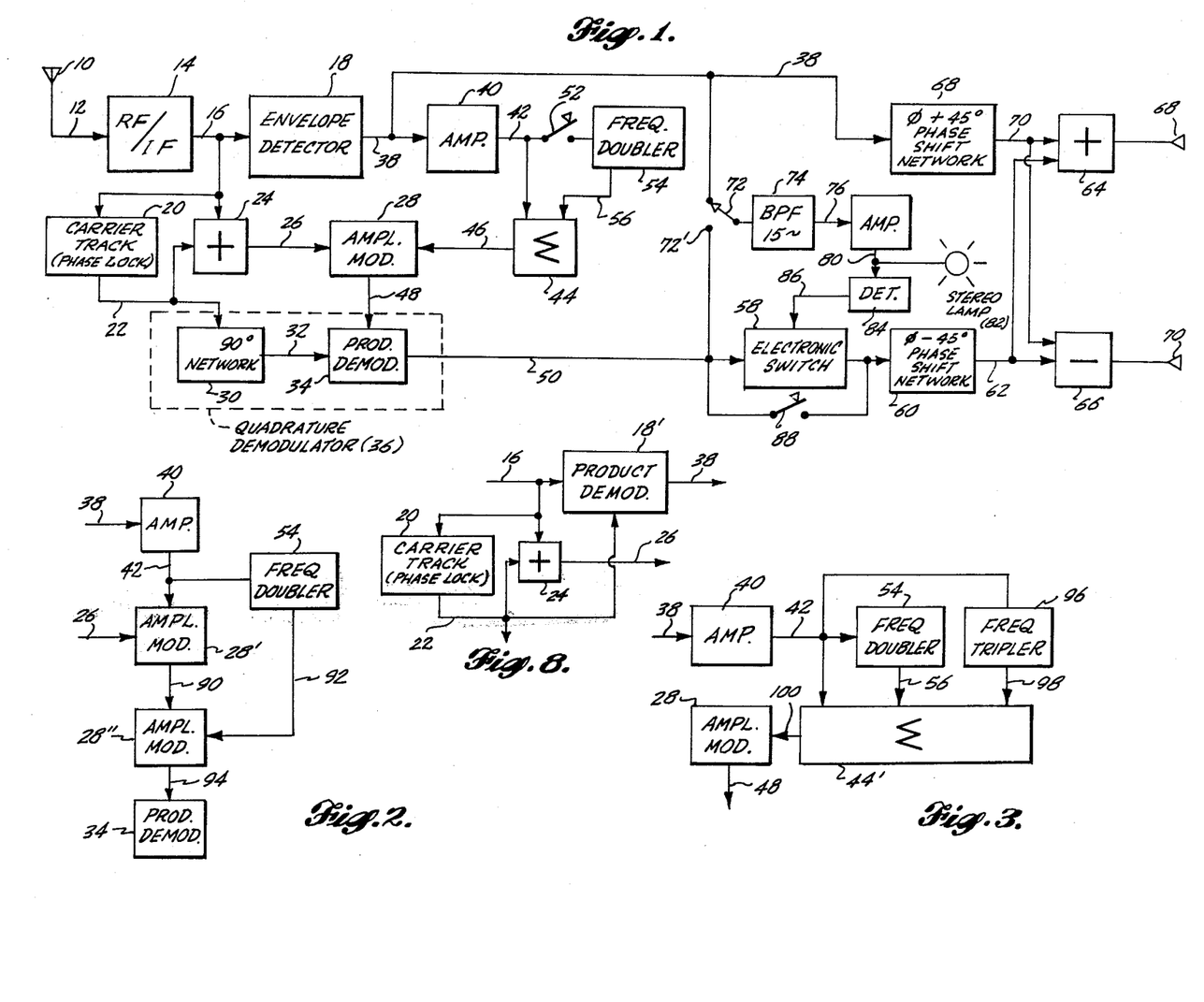
FIG. 2 is a block diagram showing of a modified technique for inverse amplitude modulation of the phase modulated exalted carrier with envelope derived fundamental and second harmonic components to reduce signal distortion, the circuit in this instance including separate amplitude modulators for the envelope fundamental and the envelope second harmonic components.
FIG. 3 is a block diagram showing of a further modified technique for inverse amplitude modulation of the phase modulated exalted carrier wave to further minimize distortion of the stereo difference (L−R) signal output, the technique in this instance involving additional amplitude modulation of the phase modulated exalted carrier with envelope derived second harmonic and third harmonic components as well as a fundamental envelope component.
FIG. 8 is a partial block diagram, showing a modification of the receiver shown in FIG. 1, and utilizing product demodulation means rather than envelope detection means as the in-phase detector deriving the L+R signal.

FIG. 1 illustrates in block diagram form a typical compatible AM stereo receiver according to the present invention. Antenna 10 is connected at line 12 to a conventional RF/IF superheterodyne circuit 14 which produces an intermediate frequency output 16, a portion of which feeds an in-phase detection means such as envelope detector 18, which is suitably a conventional diode detector circuit. IF output 16 is also fed to a carrier track filter circuit 20, such as a phase locked loop means, for carrier selection without inducing phase distortion and which may be conventional per se such as the circuit available by use of Signetics IC No. 562 or which may be in the form of phase locked loop circuit disclosed in my copending application Ser. No. 288,704, filed Sept. 13, 1972, with appropriate modification of such circuit to the extent of addition of phase detector means comparing the carrier tracking circuit input and output and maintaining such in phase, which phasal relationship is necessary in a stereo receiver application such as here presented.

The output 22 of the carrier track circuit 20 is representative of the carrier portion of the received carrier wave and is fed to the summation circuit 24 wherein such output 22 is added to the received carrier wave (at IF), a portion of the output 16 from the RE/IF stages 14 also serving as an input to the summation circuit 24. The combined output 26 from summation circuit 24 suitably, as illustrated in the typical instance in FIG. 4, involves carrier enhancement to the extent that the exalted carrier is about half again larger than the received carrier, i.e. in the specific example illustrated, has a relative voltage of 1.5 volts as compared with a relative carrier level in the receive signal of 0.9415 volt. This phase modulated, exalted carrier wave output is more suitable for demodulation to obtain phase modulation thereof (after being inversely amplitude modulated in amplitude modulator 28, as more fully discussed hereinafter) in that the enhanced carrier wave cannot have instantaneous zero amplitude, i.e. negative 100% modulation.

The carrier track circuit output 22 is also fed to a phase shift network 30 which displaces the carrier phase by +90°, and the network 30 then feeds the phase shifted carrier output 32 to product demodulator 34. Collectively, the network 30 and demodulator 34 comprise what is known per se as a quadrature demodulator, generally designated at 36. Phase shift network 30 is suitably of a type conventional per se such as shown in "Radio Engineer Handbook", edited by Keith Henny, 5th, Ed. McGraw-Hill Company, New York, New York, 1959, at Chapter 12, and also at pages 16–52. Suitably, also, product demodulator 34 may be of a type conventional per se, such as known with respect to Motorola IC No. MC1596L, for example.

The output 38 of in-phase detector 18 is the amplitude modulation envelope of the received carrier wave, and more particularly is the fundamental of such envelope in that, as known per se, the amplitude modulation or envelope in this type of AM stereo transmission is an essentially distortion-free reproduction of the stereo summation (L+R) intelligence in the sidebands of the received carrier wave. This envelope fundamental output 38 is fed to amplifier 40 and the amplifier output 42 is applied to summation circuit 44 which then provides the audio modulation input 46 for amplitude modulating the phase modulated exalted carrier wave (output 26) in amplitude modulator 28. The output 48 from amplitude modulator 28 is what may be termed an inversely amplitude modulated, phase modulated exalted carrier wave, and is utilized as the second input to product demodulator 34 in the quadrature demodulator circuit 36.

As a significant feature of the present invention, the additional amplitude modulation applied to the carrier wave in amplitude modulator 28 very materially reduces the distortion that would otherwise appear at the output 50 of the quadrature demodulator 36. Using the envelope fundamental (as at output 38) as the only input to amplitude modulator 28 (which mode of operation is realized by leaving manual switch 52 open), the distortion in the demodulated output 50 is reduced to approximately 4%, considered on a voltage comparison basis. If further reduction in harmonic distortion in the stereo difference (L−R) signal is desired or necessary, frequency doubler 54 can be brought into the circuit by closure of switch 52. In this mode of operation, the second harmonic output 56 from frequency doubler 54 is combined in summation circuit 44 with the envelope fundamental (output 42) to provide both fundamental and harmonic envelope components at the audio input 46 to amplitude modulator 28, with consequent further reduction in distortion. The approximate optimum relative levels of the amplitude modulation in amplitude modulator 28 is with the fundamental modulation about 26% and the second harmonic modulation about 8% of the total modulation voltage, on a voltage comparison basis. With these inverse amplitude modulation levels the total second order and greater order distortion appearing at the output 50 from the quadrature demodulator 36 is reduced to about 0.8%, considered on a voltage comparison basis.

Phase shift network means, known per se, are used to combine the stereo difference (L−R) signal output 50 with the envelope fundamental (L+R) output 38, to provide relatively distortion free stereo related signals (L and R), in a manner known per se and described in more detail below.

The receiver system shown in FIG. 1 is similar to the receiver system disclosed in my copending application Ser. No. 487,154 in the sense of its inclusion of means responsive to infrasonic tone modulation of the carrier to indicate stereo signal presence and preferably to automatically establish and maintain the receiver output in stereo mode when such stereo presence signal is present. The automatic shifting of receiver output mode is accomplished through control of electronic switch 58, as also discussed in more detail below. When closed, electronic switch 58 connects the demodulator output 50 to a $\theta-45°$ phase shift network 60, the output 62 from which is applied to summation circuit 64 and difference circuit 66. The stereo summation (L+R) signal appearing as the detector output 38 is likewise fed to its associated $\theta+45°$ phase shift network 68, the output 70 from which is also fed to sum and difference circuits 64, 66. As indicated, phase shift networks 60 and 68 are a phase difference network pair ($\theta-45°$ and $\theta+45°$) which are well known per se in the art and which provide a relatively constant relative phase difference of essentially 90° over an effective audio frequency range while maintaining relatively constant signal amplitudes. For more detail with respect to such networks see, for example, "Normalized Design of 90° Phase-difference Networks" by S.D. Bedrosian, appearing in IRE Transactions of the Professional Group on Circuit Theory, Vol. CP-7, No. 2, at pages 128–136 (June, 1960) and the bibliographical references therein. In general, in this type of output circuitry, the summation circuit 64 favors the left or L channel stereo information and thus the L speaker 68 is driven by the L stereo signal; similarly the difference circuit 66 favors the right or R channel stereo information and drives the R speaker 70. As of course also known per se, stereophonically indistinguishable intelligence in the received signal sidebands (i.e. monophonic intelligence) simply appears as double first order sidebands in the received carrier wave, i.e. appears as conventional double sideband amplitude modulation, and appears as part of the detected envelope and drives both the L speaker 68 and R speaker 70 monophonically.

As shown in my said applications Ser. No. 251,947 U.S. Pat. No. 3,944,749 the electronic switch 58 is controlled by an infrasonic tone (e.g. 15 Hertz) appearing as modulation on the carrier of the received signal. Assuming the infrasonic tone is transmitted by amplitude modulation of the carrier, which is presently believed to be the preferable manner of modulation, the switch 72 is shown in FIG. 1 in its correct position for responding to the infrasonic tone indication of stereo presence in that the infrasonic envelope component appearing in the detector output 38 passes through the switch 72 to bandpass filter 74 which in turn feeds the isolated infrasonic tone output 76 to amplifier 78, the output 80 from which energizes stereo presence indicator lamp 82. The infrasonic tone output 80 is also applied to detector 84 which produces a DC component at output 86 functioning to control the electronic switch 58 by closure of the switch when the stereo infrasonic tone is present (again compare the related portion of the receiver shown in my U.S. Pat. No. 3,944,749. Another mode of operation available is one in which the infrasonic tone indicative of stereo signal presence is phase modulated on the carrier wave (for which see my U.S. Pat. No. 3,908,090. In this operational mode the quadrature demodulator 36 of the receiver shown in FIG. 1 produces as a portion of its output 50 the stereo presence indicating infrasonic tone, and switch 72 is switched to its second position 72' to deliver the demodulator output 50 to the bandpass filter 74 with the filter output 76 controlling the stereo indicator 82 and the electronic switch 58 in the same manner as discussed above. It should be noted that if phase modulation or the like (e.g. quadrature modulation) is used to modulate the infrasonic tone on the carrier, the carrier track circuit 20 must be narrow enough in its output 22 so that it does not maintain track with the infrasonic modulation of the carrier. If it were to maintain such track, the infrasonic tone would be greatly attenuated and the stereo response circuitry (e.g. electronic switch 58) would be disabled. Also shown in FIG. 1 is manual switch 88, which is closed in the event the receiver is to be used solely for stereo reception. In this mode of operation, with switch 88 closed, switch 72, bandpass filter 74, amplifier 78, stereo lamp 82, detector 84 and the electronic switch 58 are unnecessary since switch 88 interconnects directly between the product demodulator output 50 and its associated phase shift network 60.

FIG. 2 is a showing of part of a modified form of AM stereo receiver according to the invention, in which the receiver circuit is as shown in FIG. 1 except for the portion thereof shown in FIG. 2 and discussed below. As shown in FIG. 2, the modified circuit employs two amplitude modulators 28' and 28", rather than the single modulator 28 of FIG. 1. Amplifier 40, which receives as its input the detector output 38, provides the fundamental component input 42 (as in FIG. 1) for the first amplitude modulator 28'. In this modified circuit the output of the first amplitude modulator 28' is the input 90 for the second amplitude modulator 28", and an additional audio input 92 to amplitude modulator 28" is derived from frequency doubler 54. The output 94 of the second amplitude modulator 28" then is employed as the input to product demodulator 34. While this arrangement requires a second amplitude modulator 28", it does provide somewhat less distortion than the circuit arrangement shown in FIG. 1.

FIG. 3 shows a further modified inverse amplitude modulating circuit, which reduces the distortion in the demodulatin stereo difference signal output even below that of the arrangement shown in FIG. 2. In the FIG. 3 circuit, the output 42 from amplifier 40 is fed to frequency doubler 54 (as in FIG. 1) which in turn provides a second harmonic output 56 (also as in FIG. 1) to summation circuit 44'. As will be apparent, the operation of amplifier 40, frequency doubler 54 and the frequency doubler output 56 combined with the fundamental output 42 in summation circuit 44' is the same as in the circuit in FIG. 1 with the switch 52 closed. In FIG. 3, however, there is the additional incorporation in the circuit of a further envelope fundamental component 42 from 3 circuit, 40, which is applied to a frequency tripler 96, the third harmonic output 98 from which is also applied to the summation circuit 44' and there combined with the fundamental component 42 and second harmonic component 56, all in a manner to provide from the summation circuit 44' an output 100 to the amplitude modulator 28 which is still more free of the fourth order sideband components which would otherwise cause distortion in the stereo difference signal output (as at 50 from quadrature demodulator 36 in FIG. 1). Further permutation of harmonic component inputs to the summation circuit (44 or 44') to further minimize stereo difference signal demodulated output distortion, will be apparent to those skilled in the art.

In general, as will be seen from the foregoing discussion of various forms of receiver circuits according to the invention, the inventive concept involved in this type of AM stereo receiver contemplates the reduction of stereo signal distortion by use of component (s) derived from the envelope of the received carrier wave to inversely modulate the total wave (with carrier exaltation or otherwise) thus canceling or tending to cancel undesired spectral components which would otherwise produce distortion when the stereo difference signal is detected by quadrature demodulator means or the like.

Figure 4:
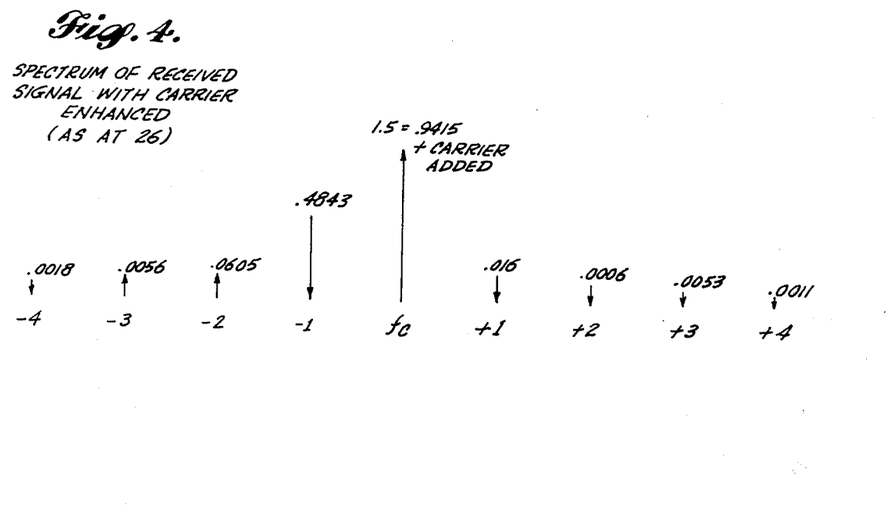
FIG. 4 is a diagrammatic showing of the spectrum of the received signal with carrier enhanced, as such appears in FIG. 1 at input 26 to the amplitude modulator 28, in the instance of the received signal being a carrier wave fully modulated (phase modulated at 0.5 radian and amplitude modulated at 50%) in one stereo channel (L), and without stereo modulation in the other stereo channel (R)
Figure 5:
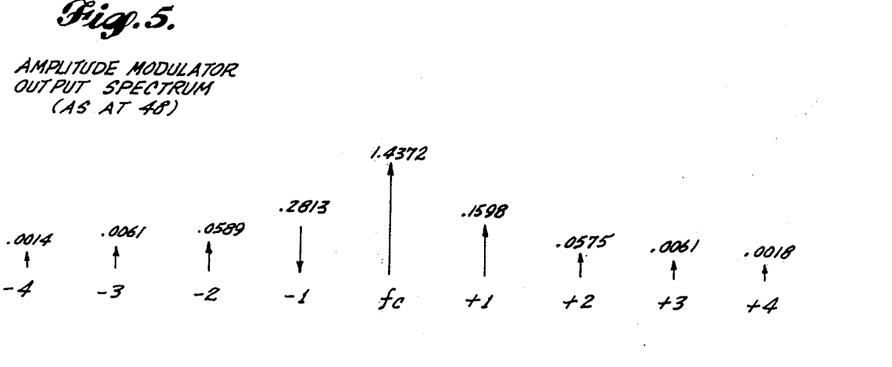
FIG. 5 is a diagrammatic showing, corresponding to the received signal spectrum shown in FIG. 4, of the amplitude modulator output spectrum as such appears in FIG. 1 at 48, with use of inverse modulation by both the fundamental and the second harmonic of the received carrier envelope.

FIG. 4 diagrammatically shows the spectrum of the modulated carrier received by the receiver shown in FIG. 1, with carrier enhanced by the carrier track filter circuit, in the representative instance of the received signal being a carrier wave fully modulated in one stereo channel (L) and without modulation in the other stereo channel (R). As will be noted, except for the carrier enhancement, this signal spectrum approximates the signal spectrum shown as the transmitted signal in FIG. 4 of my copending application Ser. No. 487,155. Theoretical analysis shows that demodulation of this signal by quadrature demodulator means and without any additional amplitude modulation (i.e. if the received signal with enhanced carrier output 26 in FIG. 1 were applied directly to the product demodulator 34 without any additional modulation in amplitude modulator 28), provides a stereo difference output signal at output 50 which is characterized by a second harmonic distortion level of about 13% (more accurately 13.05%) and a third harmonic distortion level of about 2½% (more accurately 2.33%), on a voltage comparison basis. As will be recognized, and although these amounts of harmonic distortion can be considered tolerable in some system applications, such distortion levels are excessive from the point of view of normal standards for commercial broadcast purposes. However, it is an important feature and advantage of the present invention that such harmonic distortion levels can be readily reduced to commercially acceptable values by selective inverse modulation of the phase modulated carrier wave with the detected envelope wave. If it is desired that such inverse amplitude modulation be applied to achieve near cancellation of the second order distortion, theoretical considerations indicate that the inverse modulation input should reduce the precentage of modulation of the phase modulated carrier wave by a factor of about 26%. Utilizing the approach of inversely modulating the phase modulated carrier wave with the fundamental of the envelope (i.e. with switch 52 open in FIG. 1 and applying the output 42 from amplifier 40 through the summation circuit 44 to the input 46 of amplitude modulator 28), the second harmonic distortion level is reduced to about 0.30% and the third harmonic distortion level becomes about 4.1%. (In a specific instance the level of inverse modulation applied caused a 26.09% reduction in carrier modulation, the resulting second harmonic distortion was 0.30% and the third harmonic distortion was 4.13%, on a voltage comparison basis). Although such amount of third harmonic distortion is tolerable, the substantial level thereof makes it desirable to reduce this harmonic distortion also and this can be done in the receiver shown in FIG. 1 by closure of switch 52 to add a frequency doubled envelope component (i.e. an envelope second harmonic component) to the inverse modulation input 46 to amplitude modulator 28. In a typical specific instance, with an envelope fundamental input (at 42) of about 26% and a second harmonic envelope input (at 56 from frequency doubler 54) of about 8% on a voltage comparison basis, the inversely amplitude modulated, phase modulated exalted carrier wave as such appears at output 48 from the amplitude modulator 28 has a spectral distribution essentially as shown in FIG. 5. (In a specific instance the out-of-phase amplitude modulation fundamental component was at a level of 26.09%, the second harmonic inverse amplitude modulation was at a level of 8.115% with the spectral distribution levels shown in FIG. 5 resulting).

By such usage of both fundamental and second harmonic inverse amplitude modulation, in the specific instance cited, the second harmonic distortion level became 0.295%, the third harmonic distortion level became 0.145% and the fourth harmonic distortion level was 0.725%.

As earlier indicated, an alternative technique for inversely amplitude modulating the phase modulated, exalted carrier wave with both fundamental envelope and second harmonic envelope components is shown in FIG. 2. In this instance modulation of the exalter carrier wave by the fundamental occurs in a first amplitude modulator 28' and further modulation with the second harmonic of the envelope occurs in a second amplitude modulator 28''. Analysis has shown that use of separate amplitude modulator stages for the fundamental and second harmonic inversely modulating components results in somewhat less distortion as compared with the use of a single amplitude modulator stage as in FIG. 1.

As a further refinement toward optimization of distortion reduction in the stereo difference signal output 50 in FIG. 1, FIG. 3 shows further modified circitry including a frequency tripler 96 as well as a frequency doubler 54, providing respective envelope harmonic outputs 98 and 56 which are combined with the fundamental envelope output 42 in the summation circuit 44' to further minimize out-of-band distortion.

Reduction of the higher order sideband distortion levels can be further improved by corresponding higher order envelope component inputs, and it will be readily also understood by those skilled in the art to which the invention is addressed that the technique of reducing distortion by inversely modulating the phase modulated carrier with fundamental and harmonic components of the received wave envelope and various relative levels is readily susceptible to many choices of components and component levels to the end sought.

Figure 6:
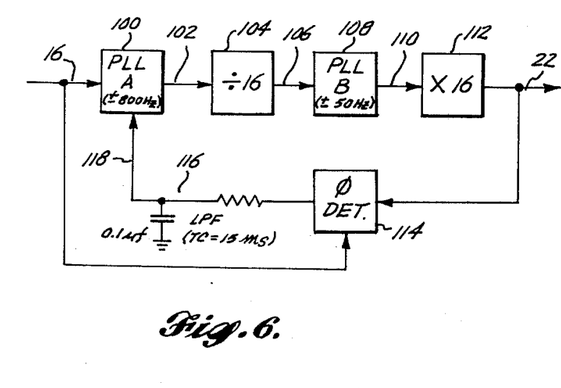
FIG. 6 is a block diagram showing more detail with respect to a typical carrier track circuit as employed in FIG. 1.

FIG. 6 illustrates in somewhat more detail a typical carrier track filter circuit of the type generally indicated at 20 in FIG. 1. As earlier indicated, this carrier track circuit can, for example, be of a type disclosed in my copending application Ser. No. 288,704. The application of such circuitry in said application Ser. No. 288,704, however, is to a voice type receiver which is not sensitive to phase, whereas proper phasing is an important consideration in a stereo receiver such as presented in FIG. 1 hereof. Because of the phasing requirement, it is necessary to compare the carrier track filter output with the input in a phase detector and use the output of the phase detector to correct the overall phase by control of one of the phase locked loops. Presuming in a typical receiver that the receiver is to follow carrier frequency errors and drift in the range of ±800 Hz, good carrier tracking practice to realize an exalted carrier signal without substantial phase distortion requires that the carrier track circuit be considerably less than ±800 Hz wide as this order of passband would pass many sideband signal components in addition to the desired carrier, particularly since these sideband components in a stereo application are not necessarily symmetrical and the carrier track circuit would follow the resulting phase modulation component of the stereo wave rather than passing only the carrier if the circuit passband is too wide. For this reason, and following the general technique disclosed in my said copending application Ser.No. 288,704, received the carrier track circuitry shown in FIG. 6 applies the carried input 16 first to a first phase locked loop circuit (PLLA), designated 100, which is suitably of a form known per se such as available from Signetics IC No. 562B, and which has a passband of ±800 Hz. The output 102 from the phase locked loop 100 is then applied to a frequency divider circuit 104 wherein the frequency of the carrier is divided by a suitable integer such as 16. This frequency division serves to also divide the frequency error by a like amount (but as a matter of interest does not push the sidebands closer together since sideband spacing is not altered by frequency division of frequency multiplication). With the carrier and any frequency error divided by the selected integer, the frequency reduced output 106 is applied to a second phase locked loop circuit (PLLB) 108 (suitably also a Signetics IC No. 562B) which has a passband of ±50 Hz, in the selected example. This circuit 108 effectively functions as a carrier tracking filter, but is sufficiently narrow not to pass any substantial amount of sideband modulation so that the filtered output 110 consists essentially of only the tracked carrier at the reduced frequency. Then, to isolate the original carrier frequency, the filtered output 110 is applied to frequency multiplier circuit 112 wherein it is multiplied by a suitable integer 16 in the example selected), providing an output 22 which is the tracked carrier at received carrier frequency and which is applied to the summation circuit 24 and to the phase shift network 30 (in FIG. 1).

Considered generally, the carrier track circuit 20 should have a bandwidth capable of tracking the expected frequency drifts in the transmitter and the receiver, and this consideration in some instances may be incompatible with use of phase modulation for the infrasonic tone. For this reason it is considered preferable to amplitude modulate such tone on the carrier, which avoids any problem as to the circuit 20 tracking the infrasonic tone.

As indicated, and because of the frequency division occurring in stage 104 as discussed above, it is necessary to compare the phase of the filter system output 22 with the phase of the received carrier. In FIG. 6 this is done by passing a portion of the output 22 to phase detector 114 (suitably a Motorola IC No. MC4004P) and through a low pass filter (LPF) 116 (typically having a time constant of 15 milliseconds) to provide a control voltage input 118 to the phase locked loop circuit 100. The tracked carrier output 22 is compared in phase with the phase of the input wave 16 in the phase detector 114 and the control voltage output 118 from the phase detector corrects for any major phase errors between such input and output (it being notable that with a frequency division of 16 there are some 16 different phase stable points at which the phase locked loop circuit 108 can lock if it were not for the phase control exerted by the phase detector 114 on the phase locked loop 100). The control exerted by the phase detector 114 on the phase locked loop 100 is made to operate relatively slowly, by action of the low pass filter circuit 116, and principally functions to correct for such major phase errors as may occur when the equipment is turned on or if there is a severe carrier fade making the frequency divider circuit 104 "slip a cog".

Figure 7:
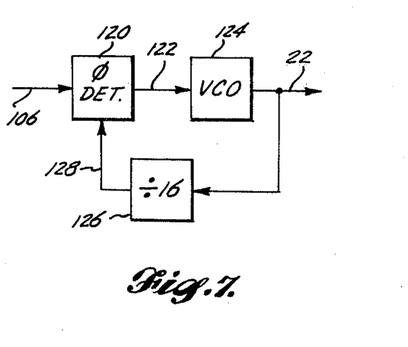
FIG. 7 is a detail showing of a modified portion of the circuit shown in FIG. 6.

FIG. 7 shows in block form a further modified circuit detail providing some simplification of the carrier track circuit shown in FIG. 6. In essence, the phase locked loop 108 and the frequency multiplier stage 112 of the circuit shown in FIG. 6 can be replaced by the circuit shown in FIG. 7, which is known per se. In general, this type of circuit involves applying the frequency divided carrier output 106 to a phase detector 102, the output 122 from which drives a voltage controlled oscillator (VCO) 124 which generates the tracked carrier output 22 at desired frequency. The VCO 124 operates at 16 times the frequency of the input frequency appearing at input 106, and such output 22 is also fed to frequency divider 126, which again divides the frequency exactly 16 times. The output 128 from frequency divider 126 is applied to phase detector 120 wherein the phase of the frequency divided output 128 is compared with the phase of the input signal at 106, with the phase detector 120 producing the output 122 which is utilized in the VCO 124 to maintain the phase of the output 22 in phase with the phase of the input signal. Viewed in another manner, the circuit shown in FIG. 7 functions as an ordinary phase locked loop but with a frequency division of 16 in the feedback path and with the VCO operating at 16 times the input frequency, i.e. to provide accurate, in-phase frequency multiplication.

FIG. 8 is a showing of a part of a further modified form of AM stereo receiver according to the invention, in which the circuit is as shown in FIG. 1 (or FIGS. 2 or 3) except for the portion thereof shown in FIG. 8 and discussed below. Rather than the envelope detector 18 of the FIG. 1 circuit, this modified form utilizes a product demodulator 18' as the in-phase detection means for deriving the L+R signal output 38, with a tracked carrier input 22 also being fed to the demodulator 18'. Although the product demodulator circuit 18' is somewhat more complex than envelope detector 18, it is advantageous from the point of view of improved signal-to-noise characteristics and is presently preferred, particularly under noisy reception conditions.

From the foregoing various further modifications, adaptations and applications of stereo receivers and applications of stereo receivers and components thereof according to the present invention will occur to those skilled in the art to which the invention is addressed, within the scope of the following claims.

What is claimed is:

1. A receiver for receiving a compatible single sideband type radio frequency (RF) carrier wave with stereo related (L and R) intelligence appearing as upper and lower sideband modulation of the carrier wave, the said carrier being amplitude modulated with stereo summation (L+R) intelligence and being phase modulated with stereo difference (L−R) intelligence, said receiver comprising:
   a. superheterodyne means developing from the received RF signal an intermediate frequency (IF) signal;
   b. detection means deriving the fundamental of the L+R intelligence from a portion of the IF signal;
   c. means for exalting the carrier of a portion of the IF signal;
   d. means inversely amplitude modulating a portion of the exalted carrier IF signal with at least the fundamental of the L+R intelligence;
   e. demodulator means deriving from the exalted carrier IF signal and the additionally amplitude modulated IF signal an audio output essentially comprising the fundamental of the L−R intelligence;
   f. separate phase shift means essentially placing the fundamental L+R and L−R signals in phase;
   g. combining means for the L+R and L−R signals and deriving L and R stereo signals therefrom; and
   h. respective acoustic output means for the L and R signals.

2. In a compatible AM stereo receiver of the type for receiving a carrier wave amplitude modulated with stereo sum (L+R) signal intelligence and phase modulated with stereo difference (L−R) signal intelligence, the improvement comprising the combination of:
   a. detection means deriving an L+R audio signal,
   b. quadrature demodulator means deriving an L−R audio signal,
   c. means inversely amplitude modulating the phase modulated carrier wave with a portion of the detection means output prior to quadrature demodulation of the carrier wave to reduce quadrature demodulation induced distortion in the demodulated L−R output signal; and
   d. means combining the L+R and L−R signals in phase to provide L and R stereo audio signal outputs.

3. A receiver according to claim 2, wherein the phase modulated carrier wave is inversely amplitude modulated with at least the fundamental of the L+R detection means output.

4. A receiver according to claim 3, wherein the inverse amplitude modulation of the carrier wave reduces the percentage of modulation of the carrier wave to render the demodulated output derived from the resulting wave essentially free of second order distortion.

5. A receiver according to claim 4, wherein the percentage of modulation of the carrier wave is reduced by the input derived from the envelope fundamental by a factor of about 26%, considered on a voltage comparison basis with the received carrier wave fully modulated.

6. A receiver according to claim 2, wherein the phase modulated carrier wave is inversely amplitude modulated with at least the fundamental and the second harmonic of the L+R detection means output.

7. A receiver according to claim 6, wherein the inverse amplitude modulation of the carrier wave reduces the percentage of modulation of the carrier wave an amount rendering the demodulated output derived from the resulting wave essentially free of second order distortion.

8. A receiver according to claim 7, wherein the percentage of modulation of the carrier wave is reduced by the input derived from the fundamental of the L+R detection means output by a factor of about 26% and by the input derived from the second harmonic of the in-phase detection means output by a factor of about 8%, considered on a voltage comparison basis with the received carrier wave fully modulated.

9. A receiver according to claim 2, wherein the phase modulated carrier wave is inversely amplitude modulated with the fundamental and the second or third harmonics of the L+R detection means output.

10. A receiver according to claim 9, wherein the inverse amplitude modulation of the carrier wave reduces the percentage of modulation of the carrier wave an amount rendering the demodulated output derived from the resulting wave essentially free of second order distortion.

11. A receiver according to claim 2, comprising: summation means enhancing the carrier of the received carrier wave prior to the inverse amplitude modulation thereof by the envelope derived signal.

12. A receiver according to claim 11, wherein the phase modulated carrier wave is inversely amplitude modulated with at least the fundamental of the L+R detection means output.

13. A receiver according to claim 12, wherein the inverse amplitude modulation of the carrier wave reduces the percentage of modulation of the carrier wave an amount rendering the demodulated output derived from the resulting wave essentially free of second order distortion.

14. A receiver according to claim 13, wherein the percentage of modulation of the carrier wave is reduced by the input derived from the fundamental of the L+R detection means output by a factor of about 26%, considered on a voltage comparison basis with the received carrier wave fully modulated.

15. A receiver according to claim 11, wherein the phase modulated carrier wave is inversely amplitude modulated with at least the fundamental and the second harmonic of the L+R detection means output.

16. A receiver according to claim 15, wherein the inverse amplitude modulation of the carrier wave reduces the percentage of modulation of the carrier wave an amount rendering the demodulated output derived from the resulting wave essentially free of second order distortion.

17. A receiver according to claim 16, wherein the percentage of modulation of the carrier wave is reduced by the input derived from the fundamental of the L+R detection means output by a factor of about 26% and by the input derived from the second harmonic of the L+R detection means output by a factor of about 8%, considered on a voltage comparison basis with the received carrier wave fully modulated.

18. A receiver according to claim 11, wherein the phase modulated carrier wave is inversely amplitude modulated with the fundamental and the second and third harmonics of the L+R detection means output.

19. A receiver according to claim 18, wherein the inverse amplitude modulation of the carrier wave reduces the percentage of modulation of the carrier wave an amount rendering the demodulated output derived from the resulting wave essentially free of second order distortion.

20. A receiver according to claim 11, wherein the means enhancing the carrier frequency comprises:
  carrier track circuit means for isolating the carrier frequency from the received carrier, and
  means combining the carrier track circuit output with a portion of the received carrier.

21. A receiver according to claim 20, wherein said carrier track circuit means includes phase locked loop circuitry.

22. A receiver according to claim 21, wherein said in-phase detection means comprises a product demodulator receiving an input from said carrier track circuit means.

23. A receiver according to claim 20, wherein said carrier track circuit means comprises a first phase locked loop circuit, frequency division means, a second phase locked loop circuit having a passband less than the passband of the said first phase locked loop circuit, frequency multiplication circuit means restoring the frequency of the output of the second phase locked loop circuit to the same frequency as the carrier input to the said first phase locked loop circuit, and phase detector means comparing the phase of the carrier input to the said first phase locked loop circuit with the carrier output of the second phase locked loop circuit and controlling the phase of the output from the first phase locked loop circuit to maintain the input and output of the carrier track circuit means in phase.

24. In a receiver according to claim 23, the improvement wherein said second phase locked loop circuit and said frequency multiplier circuit comprise a voltage controlled oscillator.

25. A receiver according to claim 2, and wherein the received carrier wave is additionally modulated with an infrasonic frequency tone indicative of stereo signal presence, the improvement comprising:
  a. means demodulating out the infrasonic frequency tone, and
  b. means controlling the audio output channels of the receiver to provide L and R stereo signal outputs therefrom responsive to the presence of such tone and to provide monophonic outputs therefrom in the absence of such tone.

26. A receiver according to claim 25, wherein said infrasonic frequency tone is at a frequency of about 15 Hz.

27. A receiver according to claim 25, wherein the carrier wave is phase or frequency modulated with the infrasonic frequency tone.

28. A receiver according to claim 25, wherein the carrier wave is amplitude modulated with the infrasonic frequency tone.

29. A receiver according to claim 2, and wherein the received carrier wave is additionally modulated with an infrasonic frequency tone indicative of stereo signal presence, the improvement comprising:
  a. means for demodulating out the infrasonic frequency tone, and
  b. visual indicator means energized responsive to the isolated infrasonic frequency tone to indicate stereo signal presence.

30. A receiver according to claim 29, wherein said infrasonic frequency tone is at a frequency of about 15 Hz.

31. A receiver according to claim 29, wherein the carrier wave is phase or frequency modulated with the infrasonic frequency tone.

32. In a receiver according to claim 29, wherein the carrier wave is amplitude modulated with the infrasonic frequency tone.

33. A receiver according to claim 2, and wherein the received carrier wave is additionally modulated with an infrasonic frequency tone indicative of stereo signal presence, the improvement comprising:
  a. means demodulating out the infrasonic frequency tone,
  b. visual indicator means energized responsive to the isolated infrasonic frequency tone to indicate stereo signal presence, and
  c. means controlling the audio output channels of the receiver to provide L and R stereo signal outputs therefrom responsive to the presence of such tone and to provide monophonic outputs therefrom in the absence of such tone.

34. A receiver according to claim 33, wherein said infrasonic frequency tone is at a frequency of about 15 Hz.

35. A receiver according to claim 33, wherein the carrier wave is phase or frequency modulated with the infrasonic frequency tone.

36. A receiver according to claim 33, wherein the carrier wave is amplitude modulated with the infrasonic frequency tone.

37. A receiver according to claim 20, and wherein the received carrier wave is additionally modulated with an infrasonic frequency tone indicative of stereo signal presence, the improvement comprising:
  a. means demodulating out the infrasonic frequency tone, and
  b. means controlling the audio output channels of the receiver to provide L and R stereo signal outputs therefrom responsive to the presence of such tone and to provide monophonic outputs therefrom in the absence of such tone.

38. A receiver according to claim 37, wherein said infrasonic frequency tone is at a frequency of about 15 Hz.

39. A receiver according to claim 37, wherein the carrier wave is phase or frequency modulated with the infrasonic frequency tone.

40. A receiver according to claim 37, wherein the carrier wave is amplitude modulated with the infrasonic frequency tone.

41. A receiver according to claim 20, and wherein the received carrier wave is additionally modulated with an infrasonic frequency tone indicative of stereo signal presence, the improvement comprising:
  a. means for demodulating out the infrasonic frequency tone, and
  b. visual indicator means energized responsive to the isolated infrasonic frequency tone to indicate stereo signal presence.

42. A receiver according to claim 41, wherein said infrasonic frequency tone is at a frequency of about 15 Hz.

43. A receiver according to claim 41, wherein the carrier wave is phase or frequency modulated with the infrasonic frequency tone.

44. A receiver according to claim 41, wherein the carrier wave is amplitude modulated with the infrasonic frequency tone.

45. In a compatible AM stereo receiver of the type for receiving a carrier wave amplitude modulated with stereo sum (L+R) signal intelligence and phase modulated with stereo difference (L−R) signal intelligence, the improvement comprising the combination of:
  a. detection means deriving an L+R signal;
  b. means inversely amplitude modulating the modulated carrier wave with a portion of the L+R detection means output;
  c. quadrature demodulation means deriving an L−R signal from the inversely amplitude modulated, phase modulated carrier wave, and
  d. means combining the L+R and L−R signals in phase to provide L and R stereo signal outputs.

46. A receiver according to claim 45, wherein said L+R detection means comprises envelope detection means.

47. A receiver according to claim 45, further comprising means exalting the carrier wave prior to inverse amplitude modulation thereof.

48. A receiver according to claim 47, wherein said L+R detection means comprises product demodulator means.

49. In a compatible AM stereo receiver of the type for receiving a carrier wave amplitude modulated with stereo sum (L+R) signal intelligence and phase modulated with stereo difference (L−R) signal intelligence, the improvement comprising the combination of:
  a. L+R detection means deriving an L+R signal;
  b. carrier track circuit means isolating the carrier frequency from the received carrier wave;
  c. means combining the carrier track circuit means output with a portion of the received carrier wave to produce a received carrier wave with exalted carrier;
  d. quadrature demodulation means deriving an L−R signal from the received carrier wave with exalted carrier, and
  e. means combining the L+R and L−R signals in phase to provide L and R stereo signal outputs.

50. A receiver according to claim 49, wherein the level of the exalted carrier is about half again larger than the level of the received carrier, on a voltage comparison basis, and wherein the effective passband of the carrier track circuit means is about ±50 Hz.

51. A receiver according to claim 50, wherein said L+R detection means comprises envelope detection means.

52. A receiver according to claim 50, wherein said detection means comprises product demodulator means.

53. In a compatible AM stereo receiver of the type for receiving a carrier wave amplitude modulated with a stereo sum (L+R) signal component and phase modulated with a stereo difference (L−R) signal component, and utilizing detection means for deriving the L+R audio signal and demodulating means for deriving the L−R audio signal and means for combining the L+R and L−R signals to isolate the L and R signal outputs, the improvement comprising:
  means for deriving a distortion cancellation component from the stereo sum signal component, and
  means for combining said distortion cancellation component with a signal including the stereo difference signal component information to substantially reduce distortion of the stereo difference signal component.

54. A receiver according to claim 53, wherein said means for deriving the distortion cancellation component comprises means separating a portion of the L+R audio signal, and said means for combining the separated distortion cancellation component with said signal including the stereo difference signal component information comprises means inversely amplitude modulating the modulated carrier wave with such L+R audio signal portion prior to demodulation thereof.

* * * * *